United States Patent [19]
Yokogawa

[11] Patent Number: 5,103,441
[45] Date of Patent: Apr. 7, 1992

[54] DUTY FACTOR CONTROL CIRCUIT WITH VARIABLE OUTPUT PULSE WIDTH FUNCTION

[75] Inventor: Fumihiko Yokogawa, Saitama, Japan

[73] Assignee: Pioneer Electronic Corporation, Tokyo, Japan

[21] Appl. No.: 674,303

[22] Filed: Mar. 25, 1991

Related U.S. Application Data

[63] Continuation of Ser. No. 166,941, Mar. 11, 1988, abandoned.

[30] Foreign Application Priority Data

Mar. 13, 1987 [JP] Japan .................................. 62-59745

[51] Int. Cl.$^5$ .................................................. G11B 7/00
[52] U.S. Cl. ........................................ 369/54; 369/59; 369/124
[58] Field of Search ................. 369/39, 44.25, 44.26, 369/44.27, 44.29, 44.32, 44.34, 44.35, 51, 54, 58, 59, 116, 124; 346/76 L; 375/3.1, 21

[56] References Cited

U.S. PATENT DOCUMENTS

| | | | |
|---|---|---|---|
| 4,425,637 | 1/1984 | Tanaka et al. | 369/124 |
| 4,516,235 | 5/1985 | Tarzaiski | 369/116 |
| 4,541,083 | 9/1985 | Maeda et al. | 369/44 |
| 4,688,204 | 8/1987 | Noyes, Jr. et al. | 369/59 |
| 4,719,612 | 1/1988 | Kenjyo | 369/124 X |
| 4,756,005 | 7/1988 | Shedd | 375/3.1 |
| 4,788,674 | 11/1988 | Maeda et al. | 369/124 |
| 4,797,872 | 1/1989 | Rokutan | 369/59 X |
| 4,937,809 | 6/1990 | Miyadera et al. | 369/116 |

*Primary Examiner*—Roy N. Envall, Jr.
*Assistant Examiner*—W. R. Young
*Attorney, Agent, or Firm*—Sughrue, Mion, Zinn, Macpeak & Seas

[57] ABSTRACT

A duty factor control circuit for use in an optical disk apparatus has first and second delay circuits for synchronously extending or shortening the width of an input pulse by equal amounts. The operation of the circuit is such that an output pulse center is synchronized with a center of a falling edge of a clock timing pulse, to compensate for time base errors.

4 Claims, 6 Drawing Sheets

FIG. 7
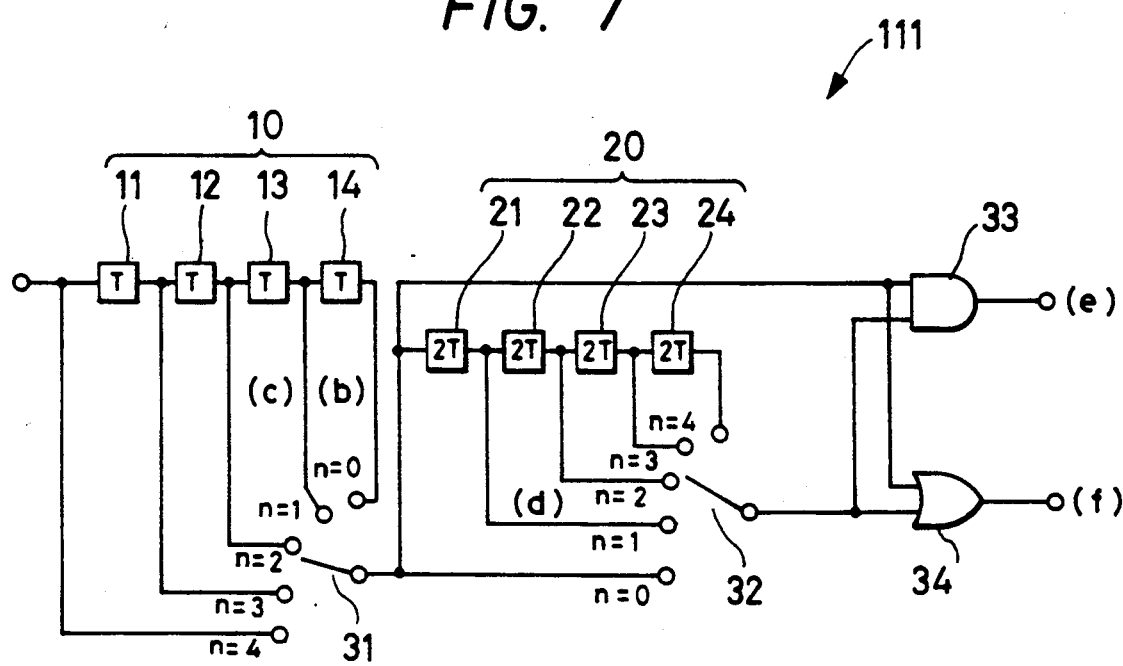
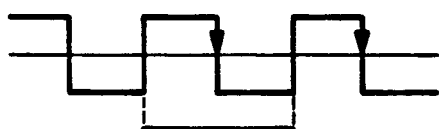
FIG. 8A (a)
FIG. 8B (b)
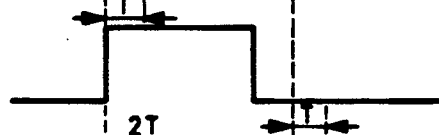
FIG. 8C (c)
FIG. 8D (d)
FIG. 8E (e)
FIG. 8F (f)

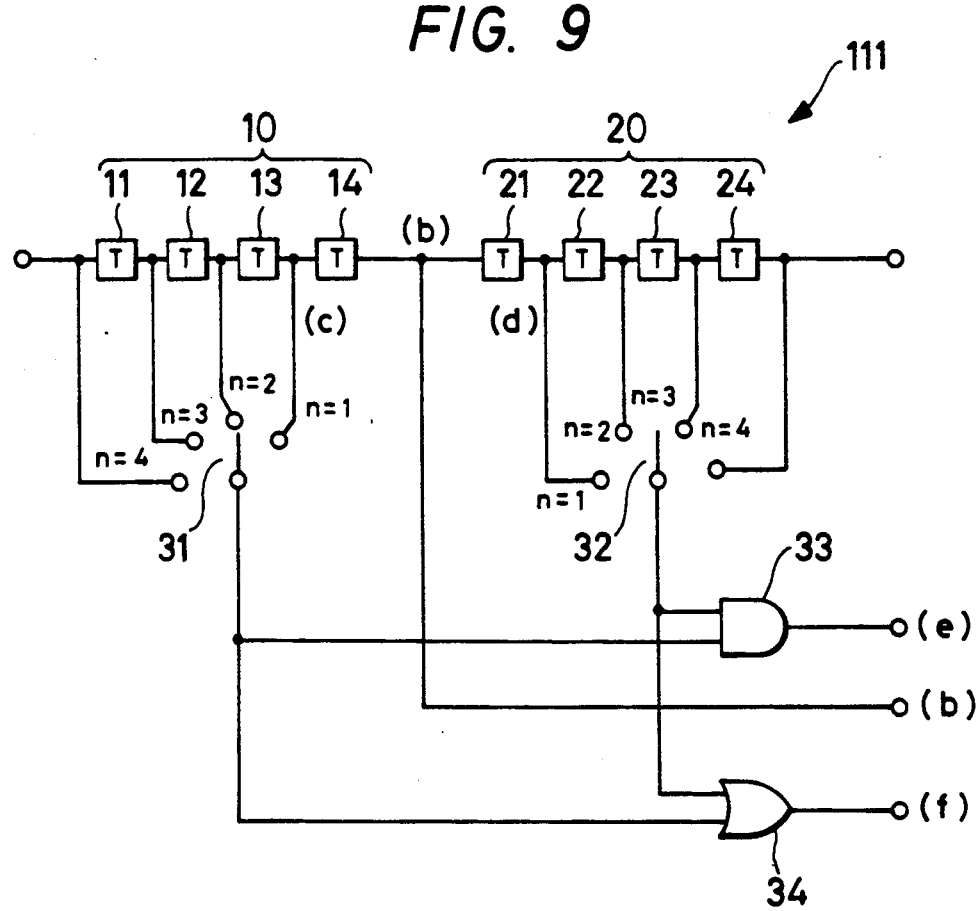
FIG. 9
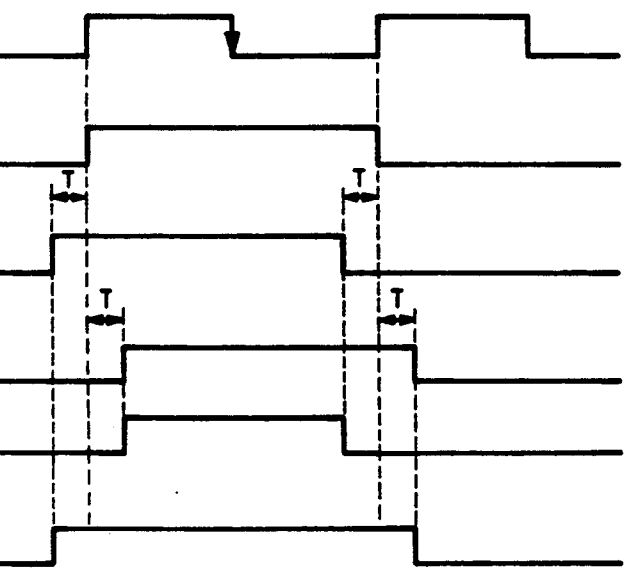
FIG. 10A (a)
FIG. 10B (b)
FIG. 10C (c)
FIG. 10D (d)
FIG. 10E (e)
FIG. 10F (f)

DUTY FACTOR CONTROL CIRCUIT WITH VARIABLE OUTPUT PULSE WIDTH FUNCTION

This is a continuation of application Ser. No. 07/166,941, filed Mar. 11, 1988, now abandoned.

BACKGROUND OF THE INVENTION

The present invention relates to a duty factor control circuit suitable for use in an optical disk apparatus, particularly for a recording/reproducing circuit in an optical disk drive device of sample servo type.

FIG. 1 shows recorded patterns on the tracks of an optical disk. Each sector of the optical disk includes plural servo blocks (e.g., 43 servo blocks). One servo block includes a preformat portion composed of a servobyte of two bytes and a recording portion succeeding thereto composed of a data-byte of 16 bytes. The servobyte includes a clock pit and two wobbled pits located to the right and left with respect to the center of the track. A tracking error signal is generated in response to a detection signal of the two wobbled pits, and a clock signal is generated in response to a detection signal of the clock pit. Data are recorded on or reproduced from the disk, synchronously with the clock produced by the clock pit.

FIG. 2 is a block diagram of a conventional waveform shaping circuit in an optical disk apparatus. A pickup 1 reproduces a signal recorded on an optical disk (not shown) and puts out the reproduced (RF) signal. When the pickup encounters a pit on the surface of the optical disk, as shown in FIG. 3A, the level of the RF signal is lowered, as shown in FIG. 3B. A differentiation circuit 2 differentiates the RF signal applied from the pickup 1, and provides an output as shown in FIG. 3C. A detection circuit 3 detects a zero crossing of the output of the differentiation circuit 2 and produces a corresponding pulse, as shown in FIG. 3D. The pulse, which has a predetermined width and starts from the zero crossing point, is applied to a duty factor control circuit.

FIG. 4 is a block diagram showing a conventional duty factor control circuit. If a pulse as shown in FIG. 5B (corresponding to the pulse of FIG. 3D) is applied to the duty factor control circuit in synchronism with a clock produced by the clock pit on the disk as shown in FIG. 5A (in this case, a falling edge of a clock pulse is positioned at a center of the pulse width), the input pulse is delayed by a delay circuit 5 by a predetermined period of time, so that a delayed pulse is generated, as shown in FIG. 5C. The input pulse and the delayed pulse are applied to an AND gate 4 and an OR gate 6. As a result, pulses each having a width (and therefore a duty factor) different from the input pulse are produced at the outputs (d) and (e) as shown in the waveform diagrams of FIGS. 5D and 5E, respectively.

However, in the conventional duty factor control circuit, either a leading or a trailing edge of an input pulse may be varied, while the other edge remains fixed, so that the center of an output pulse does not coincide with an edge of a clock pulse. The result can cause what is known as a time base error. As a result, for example, when a level (H or L) of an output pulse is read in accordance with the timing of the falling edge of a clock pulse, the time base error can influence the operation of the duty factor control circuit depending on the direction of the error.

The duty factor control circuit of FIG. 4 is used not only in a disk reproducing circuit as described above, but also used in a disk recording circuit. In the case where the duty factor control circuit is used in a disk recording circuit, if the center of the duty factor controlled data pulse to be recorded on the disk does not coincide with an edge of a clock pulse there is the same problem as that occurs in the disk reproducing circuit described already.

The problem which occurs in the case where the center of the duty factor controlled data pulse does not coincide with the edge of the clock pulse will be discussed below with reference to FIG. 6. The description is made, for example, about the case where the duty factor control circuit of FIG. 4 is used in a data recording circuit.

If a data pulse to be recorded as shown in FIG. 6B is applied to the duty factor control circuit of FIG. 4 in synchronism with a clock as shown in FIG. 6A (in this case, a falling edge of a clock pulse is positioned at a center of the pulse width), the data pulse is delayed by a delay circuit 5 by a predetermined period of time, so that a delayed pulse is generated, as shown in FIG. 6C. The data pulse and the delayed pulse are applied to an AND gate 4 and an OR gate 6. As a result, pulses each having a width (and therefore a duty factor) different from the data pulse are produced at the outputs (d) and (e) as shown in the waveform diagrams of FIGS. 6D and 6E, respectively. If the pulse of FIG. 6D is used, the pulse forms a pit as shown in FIG. 6F on the disk. On the other hand, if the pulse of FIG. 6E is used, the pulse forms a pit as shown in FIG. 6G on the disk.

When reproducing the pit shown in FIG. 6F (or 6G) on the disk, a level (H or L) of a reproducing signal shown in FIG. 6H (or 6I) is read in accordance with the timing of the edge (e.g., a falling edge) of a clock pulse. In this case, jitter (time axis deviation) is occurred, the reading timing is deviated. In accordance with the direction of the deviation, the probability of such an error that the L(H) level will be erroneously read as an H(L) level becomes high.

SUMMARY OF THE INVENTION

In view of the foregoing and other deficiencies, according to the present invention, a pulse width, defined by a duty factor imposed by the duty factor control circuit, is varied so that an edge of a clock pulse is always positioned at a center of the pulse width.

The duty factor control circuit according to the present invention comprises a first delay circuit for delaying an input pulse by a first predetermined period of time, a second delay circuit for delaying an output of the first delay circuit by a second predetermined period of time, and a logical circuit for producing a logical AND or a logical OR between the respective outputs of the first and second delay circuits.

The foregoing and other objects, features and advantages of the invention will be apparent from the following more particular description of preferred embodiments of the invention as illustrated in the accompanying drawings.

BRIEF DESCRIPTION OF THE DRAWINGS

FIGS. 5A-5E are timing charts showing relationships among pulses output at various points in the circuit of FIG. 4;

FIG. 7 is a block diagram of a first embodiment of a duty factor control circuit according to the present invention;

FIGS. 8A-8F are timing charts showing relationships among pulses provided at various points in the circuitry in the first embodiment;

FIG. 9 is a block diagram of another embodiment of a duty factor control circuit according to the present invention;

FIGS. 10A-10F are timing charts showing relationships among pulses provided at various points in the circuitry in the second embodiment;

DETAILED DESCRIPTION OF THE PREFERRED EMBODIMENTS

Figure 1:
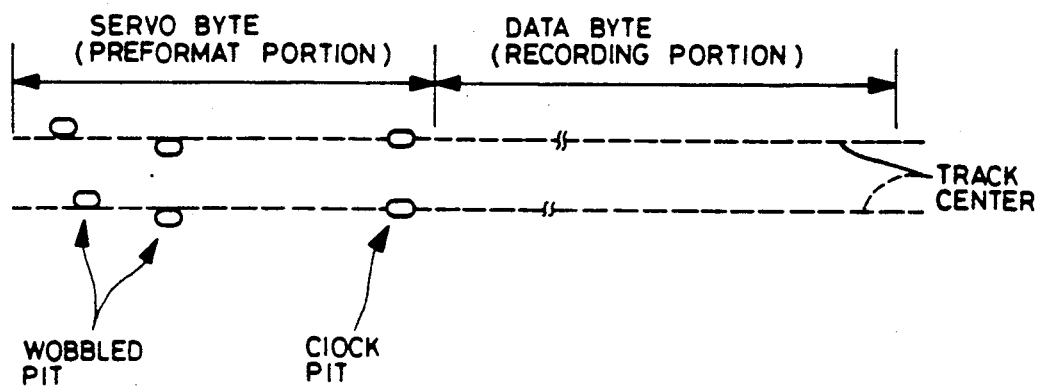
FIG. 1 is a diagram showing the pattern of pits formed on the surface of an optical disk.
Figure 2:
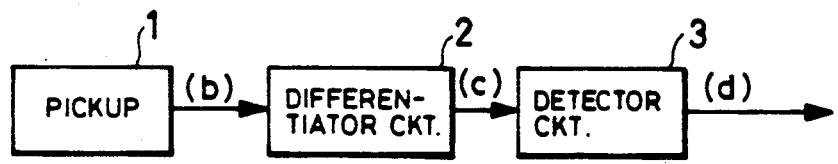
FIG. 2 is a block diagram of a waveform shaping circuit in an optical disk apparatus.
Figure 3A:
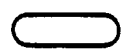
FIGS. 3A-3D are timing charts for the circuit of FIG. 2.
Figure 3B:
Figure 3C:
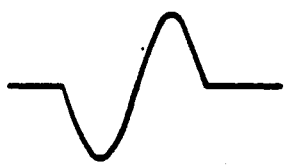
Figure 3D:
Figure 4:
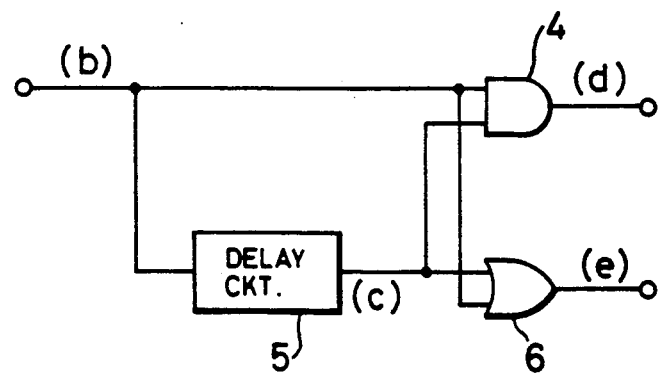
FIG. 4 is a block diagram of a duty factor control circuit in the conventional apparatus.
Figure 6A:
FIGS. 6A-6I are another timing charts showing relationships among pulses output at various points in the circuit of FIG. 4, formed pits and reproduced signal.
Figure 6B:
Figure 6C:
Figure 6D:
Figure 6E:
Figure 6F:
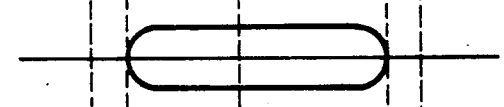
Figure 6G:
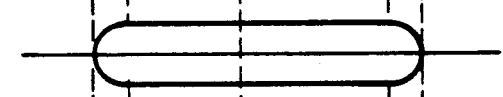
Figure 6H:
Figure 6I:
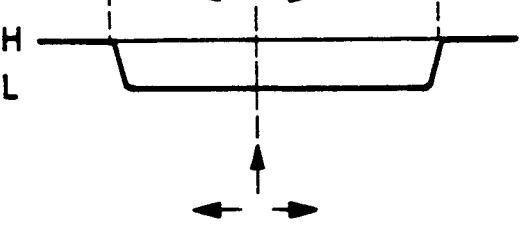

FIG. 7 is a block diagram of a duty factor control circuit 111 according to a first embodiment of the present invention. A delay circuit 10 for delaying an input pulse is constituted by four delay elements 11 through 14. The delay length of each of the delay elements 11 through 14 is set to be a predetermined amount (call it T). A delay circuit 20 for delaying the output of the delay circuit 10 is constituted by four delay elements 21 through 24. The delay length of the delay elements 21 through 24 is set to be 2T.

First, the phase relation between a clock and an input pulse is adjusted so that a falling edge of a clock pulse, shown in FIG. 8A, coincides with a center of a pulse, shown in FIG. 8B, which is produced by the delay element 14. That is, a pulse applied to the input of the delay element 14 (an output of the delay element 13) is advanced in phase by the time T relative to a pulse produced from the output (b) of the delay element 14. Similarly, the pulses at the respective inputs of the delay elements 13, 12 and 11 are advanced in phase successively by the time length T. A switch 31 is switched to select a desired one of the pulses at the respective inputs of the delay elements 11 through 14.

The pulse selected by the switch 31 is applied to the delay element 21 so as to be delayed (or lagged) by a time length 2T. Similarly, the pulse is delayed by successive amounts of time 2T (with respect to the output of the delay element 14) by the delay elements 22, 23 and 24. A switch 32 is interlocked with the switch 31, so that, for example, when the switch 31 is switched to select the pulse at the input of the delay element 14, the switch 32 is switched to select the pulse at the output of the delay element 21. Similarly, selection is synchronized so that the delay elements 13, 12 and 11 correspond to the delay elements 22, 23 and 24 respectively.

Assuming now that the input (c) of the delay 14 and the output (d) of the delay element 21 are selected by the switches 31 and 32, the pulse passed through the switch 31, shown in FIG. 8C, is advanced in phase by the time T relative to the output (b) of the delay element 14, shown in FIG. 8B. The pulse passed through the switch 31 is delayed by the delay element 21 by the time length 2T, so that the output from the switch 32, shown in FIG. 8D, is delayed by the time T relative to the output of the delay element 14.

Accordingly, if a logical AND between the respective outputs from the switches 31 and 32 is carried out by an AND gate 33 constituting the logical circuit, a pulse, shown in FIG. 8E, is produced at the output (e) such that an edge of a clock pulse is positioned at the center of the pulse and the pulse width is narrowed by the time T at each of the leading and trailing edges of the pulse. Similarly, if a logical OR between the respective outputs of the switches 31 and 32 is carried out by an OR gate 34 constituting the logical circuit, a pulse (FIG. 8F) is produced at the output (f) such that an edge of a clock pulse is positioned at the center of the pulse and the pulse width is widened by the time T at each of the leading and trailing edges of the pulse.

By selecting other delay element outputs in the delay circuitry 10 and 20, the output pulse width can be selectively widened or narrowed by 2T, 3T, or 4T, in a manner similar to that described above. Thus, the pulse width can be successively widened or narrowed by varying multiples of the predetermined time T by suitably selecting the delay elements in the delay circuits 10 and 20.

Also, it should be noted that, while the delay element 14 is shown in FIG. 7 for the sake of completeness of description, to provide a reference for the various timings in the circuit, the output of the element 14 is not used in this embodiment. Thus, in a practical implementation, the element may be omitted.

FIG. 9 shows another (i.e., the second) embodiment of the duty factor control circuit 111 according to the present invention. In FIG. 9, the parts corresponding to those in FIG. 7 bear corresponding reference numbers. In this embodiment, the delay time of each of the delay elements 21 through 24 in the delay circuit 20 is set to be T, and the output of the delay element 14 is applied to the delay element 21 as it is without being selected by the switch 31. The respective outputs of the switches 31 and 32 are applied to the AND gate 33 and the OR gate 34.

Also in this case, a clock signal, shown in FIG. 10A, is previously adjusted so that an edge of a clock pulse is positioned at a center of a pulse, shown in FIG. 10B, at the output (b) of the delay element 14. Accordingly, for example, the input of the delay element 14 (that is, the output of the delay element 13) is selected by the switch 31, and the output from the switch 31 is advanced in phase relative to the output of the delay element 14 by the time T, as shown in FIG. 10C. Similarly, the output from the switch 32 (that is, the output of the delay element 21) is lagged in phase by the time T relative to the output of the delay element 14, as shown in FIG. 10D. Accordingly, if a logical AND between the respective outputs from the switches 31 and 32 is carried out by an AND gate, it is possible to produce a pulse having a width which is narrowed by the time T at each of the leading and trailing edges thereof, as shown in FIG. 10E. If a logical OR is performed with an OR gate, it is possible to produce a pulse having a width which is widened by the time T at each of the leading and trailing edges thereof, as shown in FIG. 10F.

Also, in this case, it is possible to successively vary the duty factor of a pulse by varying multiples of a time T through suitable selection of the delay elements.

As described above, the duty factor control circuit according to the present invention comprises a first delay circuit for delaying an input pulse by a first predetermined period of time, a second delay circuit for delaying an output of the first delay circuit by a second predetermined period of time, and a logical circuit for producing a logical AND or a logical OR between the respective outputs of the first and second delay circuits. Accordingly, it is possible to control the duty factor of an input pulse while making an edge of a clock always coincide with a center of an output pulse.

Figure 11:
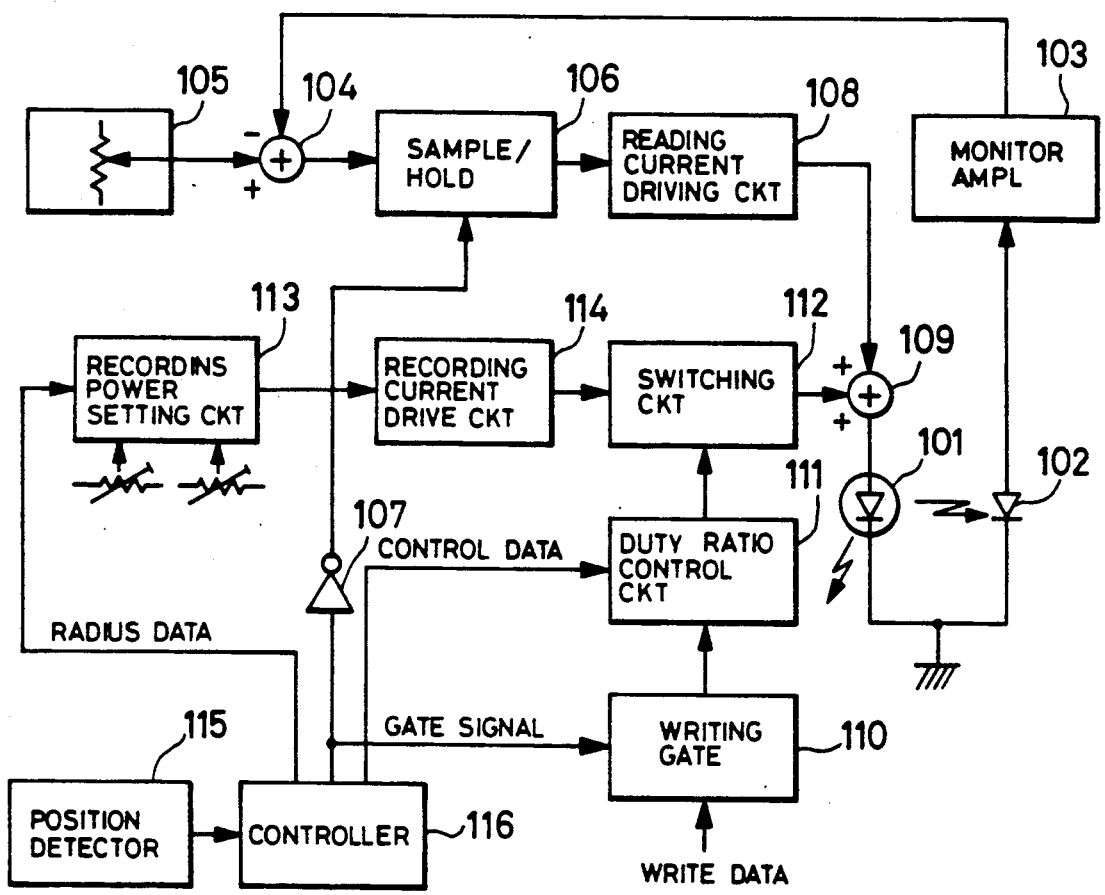
FIG. 11 is a block diagram showing a recording/reproducing circuit to which the duty factor control circuit of the present invention can be applied.

The duty factor control circuit 111 of the present invention shown in FIGS. 7 and 9 described above can be applied for a duty factor control circuit in a recording/reproducing circuit in an optical disk drive of sample servo type as shown in FIG. 11.

FIG. 11 is a block diagram showing a light source driving apparatus of an optical information recording/reproducing apparatus having a duty factor control circuit to which the present invention is applied. In the optical information recording apparatus, power control for controlling the light power of the recording light beam in accordance with the radial position of a recording light beam spot, as well as duty control for controlling the duty ratio of the recording signal in accordance with the radial position, are performed in combination.

In the drawing, a laser diode 101 is used as a light source for emitting a recording/reading light beam for recording data on a disk and for reading out data from the disk, and a monitor diode 102 is built into the laser diode 101. The monitor diode 102 is provided for receiving a beam emitted from the rear of the laser diode 101, and the output of the monitor diode 102 is applied to a subtractor 104 through a monitor amplifier 103 so as to be subtracted from the output of a reading-power setting circuit 105 which sets the power of the reading light beam. That is, the light power is automatically controlled such that the output of the monitor diode 102 is fed back and compared with the desired power setting value set by the reading-power setting circuit 105, so as to maintain a constant light power independently of temperature. The output of the subtractor 104 is sampled and held in a sample-hold circuit 106 upon the application of a signal obtained by inverting a writing gate signal via inverter 107. The output of the sample-hold circuit 106 is applied to the laser diode 101 through a reading-current driving circuit 108 and an adder 109 so as to be used as the driving current for the laser diode 101.

Write data, on the other hand, are applied to a duty factor control circuit 111, to which the present invention is applied, through a writing gate circuit 110 so as to control the duty factor (or duty ratio), and then applied to a switching circuit 112. In the writing of data, laser power (recording power) larger than the rading power is required. This recording power is set by a recording-power setting circuit 113, and a recording current corresponding to the set power value is applied from a recording-current driving circuit 114 to the switching circuit 112. The recording current is switched in accordance with the duty ratio of the writing data as set in the duty ratio control circuit 111, and is added at adder 109 to a reading current used in the reading operation conducted immediately before, which value is held in the sample hold circuit 106, so as to be used as the driving current of the laser diode 101 in recording.

On the CAV disk, the linear velocity is different between inner and outer circumferences of the disk, and larger recording power is required as the position approaches the outer circumference. Therefore, a position detector 115 is arranged to detect the position of the recording light spot (not shown) of the light beam emitted from the laser diode 101 on the information recording surface of the disk (not shown), in the radial direction of the disk, and a controller 116 is arranged to send radius data to the recording-power setting circuit 113 on the basis of the detected information. The recording-power setting circuit 113 is arranged so as to set the recording power value in accordance with the radius data. As a result, in recording the CAV disk, the recording power is changed in accordance with the radial position of the recording light spot on the disk.

The position detector 115 has been conventionally provided in optical information recording/reproducing devices so as to produce positional information in accordance with the radial position of the recording light spot in association with a pickup (not shown) provided with the laser diode 101 built therein.

The controller 116 is constituted, for example of a microcomputer, and is arranged to send out control data to the duty ratio control circuit 111, radius data to the recording-power setting circuit 113, and a gate signal to the writing gate circuit 110.

Figure 12:
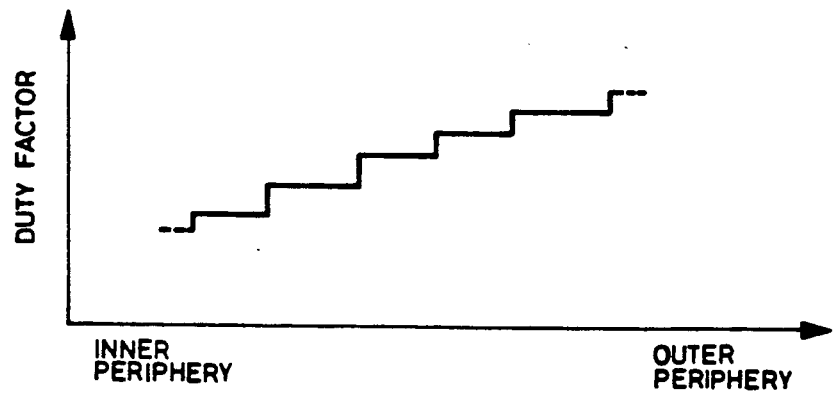
FIG. 12 is a diagram showing how the duty factor is changed in accordance with disk radial position by the circuit of FIG. 11.

The power of the light emitted from the laser diode 101 has a limit, and sufficient recording power cannot be obtained for recording on the outer circumferential region of the disk where the linear velocity is high. Therefore, the low recording power is compensated by controlling the duty ratio of the write date stepwise in accordance with the radius data from the controller 116, via the duty factor control circuit 111 of the present invention, using the characteristic shown in FIG. 12.

In the recording circuit of FIG. 11, the input date pulse to be recorded on the disk are applied to a duty factor control circuit 111 through a writing gate circuit 110 so as to control the duty factor, and then applied to a switching circuit 112. The controller 116 sends a control signal to the duty factor control circuit 111 so as to select the positions n of the switches 31 and 32 of the circuit 111, respectively, to thereby obtain a desired duty ratio (refer to FIG. 7 or 9). The controller 116 sends another control signal to the circuit 111 so as to actuate a switch (not shown) to select one of the output data (e) and (f) of the duty factor control circuit 111, so that increase or decrease in the duty ratio is determined (refer to FIG. 7 or 9).

As described above, in the optical information recording/reproducing apparatus, the power control for controlling the light power of a recording light beam in accordance with the radial position of a recording light beam spot, and duty ratio control for controlling the duty ratio of a recording signal in accordance with the radial position, are used in combination. The duty factor control is performed with maintaining the center of the duty-controlled pulse at the edge of the clock pulse, with using the duty control circuit of the present invention. Therefore, in recording a CAV disk, it is made possible to obtain satisfactory recording sensitivity over the entire recording region of the disk.

The recording/reproducing circuit of FIG. 11 is described in more detail in the U.S. patent application No.

07/157,667 filed on Feb. 19, 1988 entitled "Optical Information Recording Apparatus".

What is claimed is:

1. A duty factor control circuit for adjusting an input pulse such that a center of the adjusted input pulse coincides with an edge of a clock pulse, the control circuit comprising:

first delay means including n serially connected first delay circuits, each of said first delay circuits delaying an input pulse thereto by a first non-zero predetermined period T, a center of an output of the nth first delay circuit coinciding with an edge of the clock pulse;

first switching means for selecting an output of the (n-m)th first delay circuit;

second delay means coupled to receive the selected output of said first switching means, and including n serially connected second delay circuits, each of said second delay circuits delaying an input thereto by a second predetermined period 2T which is twice the first predetermined period;

second switching means for selecting an output of the mth second delay circuit; and logical means for outputting at least one of a logical AND and a logical OR between the selected outputs of said first and second switching means, wherein n and m are each an integer greater than 1, and wherein m is not greater than n.

2. The duty factor control circuit as claimed in claim 1, wherein said first and second switching means are interlocked with each other such that the respective selections of said first and second switching means are synchronized.

3. A duty factor control circuit for adjusting an input pulse such that a center of the adjusted input pulse coincides with an edge of a clock pulse, the control circuit comprising:

first delay means including n serially connected first delay circuits, each of said first delay circuits delaying an input pulse thereto by a first non-zero predetermined period, a center of an output of the nth first delay circuit coinciding with an edge of the clock pulse;

first switching means for selecting an output of the (n-m)th first delay circuit;

second delay means coupled to receive the selected output of said first switching means, and including n serially connected second delay circuits, each of said second delay circuits delaying an input thereto by a second predetermined period;

second switching means for selecting an output of the mth second delay circuit; and logical means for outputting at least one of a logical AND and a logical OR between the selected outputs of said first and second switching means, wherein n and m are each an integer greater than 1, and wherein m is not greater than n.

4. The duty factor control circuit as defined in claim 3, wherein said first and second switching means are interlocked with each other such that the respective selections of said first and second switching means are synchronized.

* * * * *